(12) United States Patent
Cooper et al.

(10) Patent No.: US 10,220,463 B2
(45) Date of Patent: *Mar. 5, 2019

(54) CONTACT TIP AND WELD WIRE FOR ARC WELDING

(71) Applicant: Edward L. Cooper, Clarklake, MI (US)

(72) Inventors: Edward L. Cooper, Clarklake, MI (US); Boris Zlotin, West Bloomfield, MI (US)

(73) Assignee: Edward L. Cooper, Clarklake, MI (US)

( * ) Notice: Subject to any disclaimer, the term of this patent is extended or adjusted under 35 U.S.C. 154(b) by 978 days.

This patent is subject to a terminal disclaimer.

(21) Appl. No.: 14/531,428

(22) Filed: Nov. 3, 2014

(65) Prior Publication Data
US 2015/0048056 A1    Feb. 19, 2015

Related U.S. Application Data

(63) Continuation of application No. 13/299,689, filed on Nov. 18, 2011, now Pat. No. 8,878,098.

(60) Provisional application No. 61/415,574, filed on Nov. 19, 2010.

(51) Int. Cl.
*B23K 9/12* (2006.01)
*B23K 9/16* (2006.01)
*B23K 9/173* (2006.01)
*B23K 35/02* (2006.01)

(52) U.S. Cl.
CPC ........... *B23K 9/123* (2013.01); *B23K 9/16* (2013.01); *B23K 9/173* (2013.01); *B23K 35/0277* (2013.01)

(58) Field of Classification Search
CPC ...... B23K 35/0277; B23K 9/123; B23K 9/16; B23K 9/173
See application file for complete search history.

(56) References Cited

U.S. PATENT DOCUMENTS 2,981,825 A * 4/1961 Rundell ............... B23K 9/123
                                                        219/136
5,635,091 A * 6/1997 Hori ...................... B23K 9/123
                                                        219/136
8,878,098 B2 * 11/2014 Cooper .................. B23K 9/16
                                                        219/137.61

(Continued)

FOREIGN PATENT DOCUMENTS

CA         2435627 A1 * 1/2005
DE        10322116 B3     7/2004

(Continued)

OTHER PUBLICATIONS

Machine translation of Japan Patent document No. 05-237,658, Jan. 2015.*

(Continued)

*Primary Examiner* — Geoffrey S Evans
(74) *Attorney, Agent, or Firm* — Brinks Gilson & Lione

(57) ABSTRACT

A welding system having a welding gun with a contact tip having an bore extending therethrough and a consumable weld wire. The cross-sectional shape of the bore of the contact tip being is essentially identical to the cross-sectional shape of the weld wire. The bore having an essentially elliptical cross-sectional shape and the weld wire having an essentially elliptical cross-sectional shape.

13 Claims, 15 Drawing Sheets

(56) References Cited

U.S. PATENT DOCUMENTS

| | | | |
|---|---|---|---|
| 9,440,304 B2* | 9/2016 | Cooper | B23K 9/16 |
| 2003/0019857 A1 | 1/2003 | Takagi et al. | 219/137.61 |
| 2003/0127444 A1* | 7/2003 | Steenis | B23K 9/123 |
| | | | 219/137.61 |
| 2003/0209530 A1 | 11/2003 | Stuart et al. | 219/137.61 |
| 2010/0206852 A1 | 8/2010 | Ohkubo et al. | 219/108 |
| 2011/0006047 A1 | 1/2011 | Penrod et al. | 219/137 R |

FOREIGN PATENT DOCUMENTS

| | | | |
|---|---|---|---|
| JP | 56-131096 A | | 10/1981 |
| JP | 4-274894 A | | 9/1992 |
| JP | 5-237658 A | | 9/1993 |
| JP | 5-237658 A1 | * | 9/1993 |
| JP | 2000-000671 A | * | 1/2000 |
| JP | 2010-099705 A | * | 5/2010 |
| KR | 10-2007-0047879 | | 10/2007 |
| WO | WO-2009/041368 A | | 4/2009 |

OTHER PUBLICATIONS

Machine translation of Japan Patent document No. 2000-000,671, Nov. 2017.*

Machine translation of Japan Patent document No. 2010-099,705, Nov. 2017.*

* cited by examiner

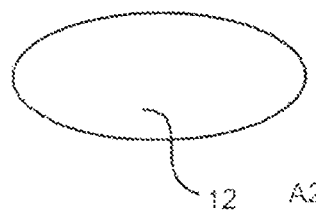
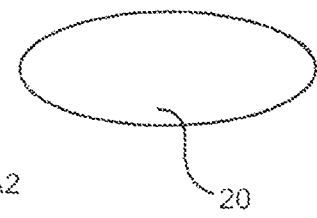
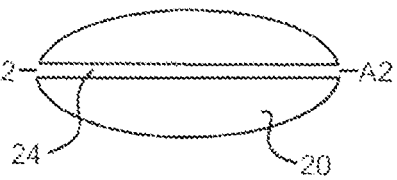
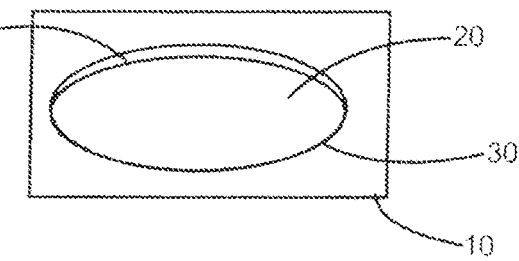
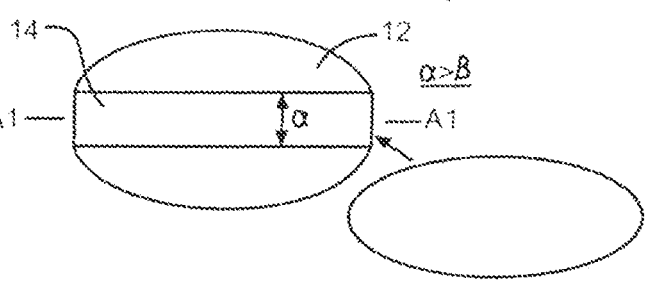
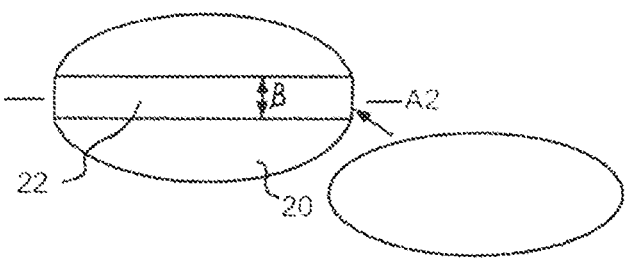
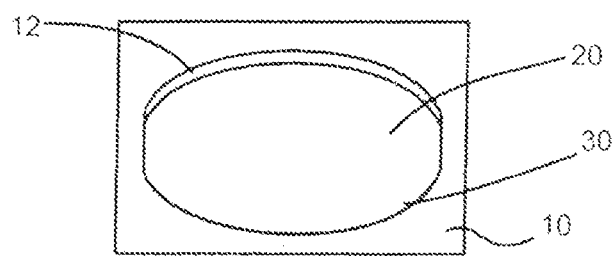

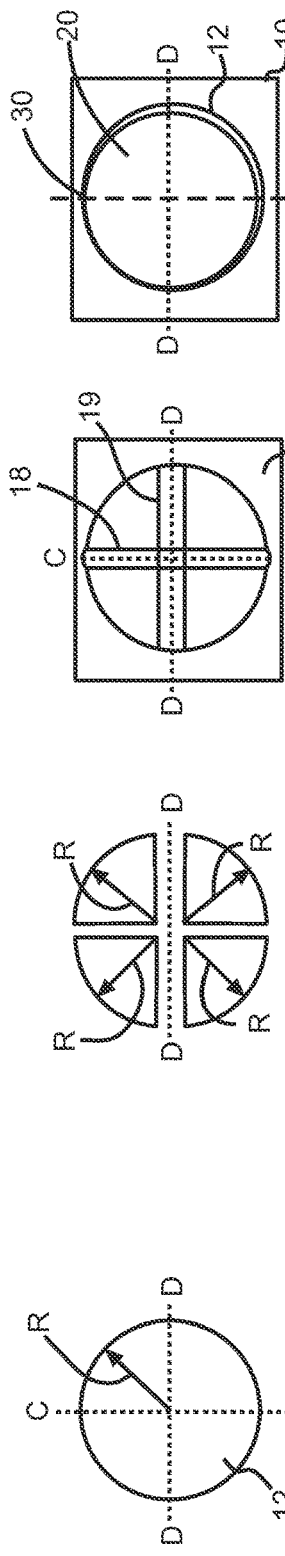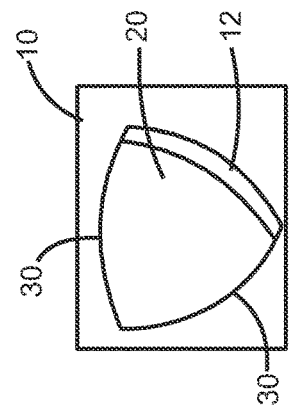

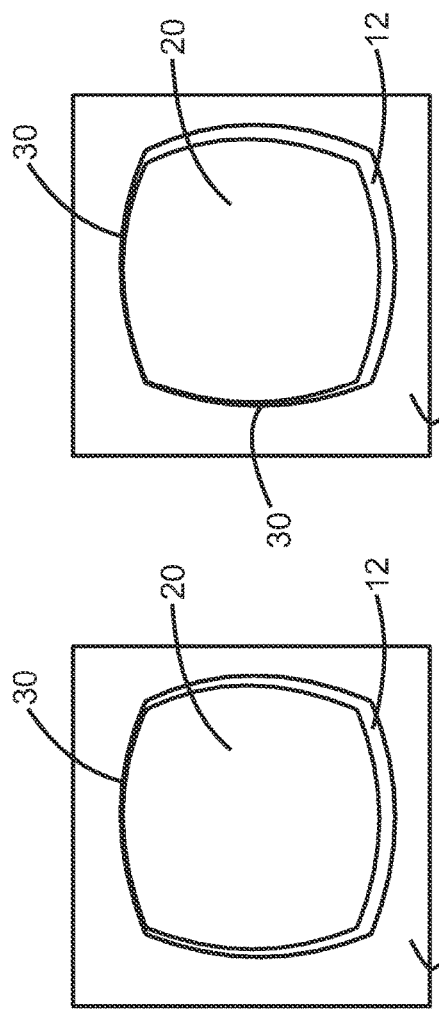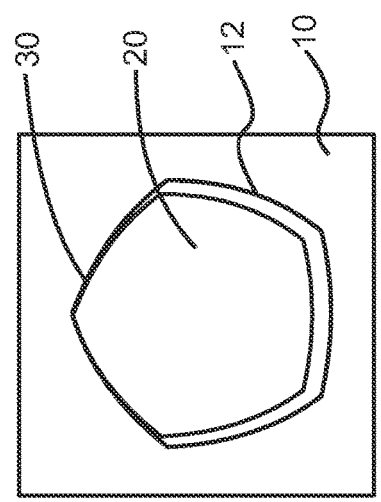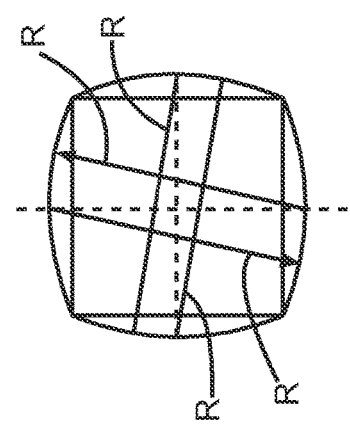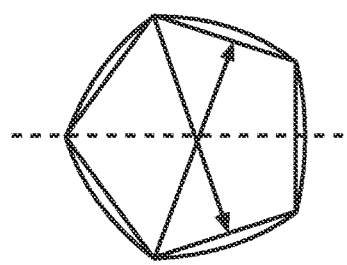

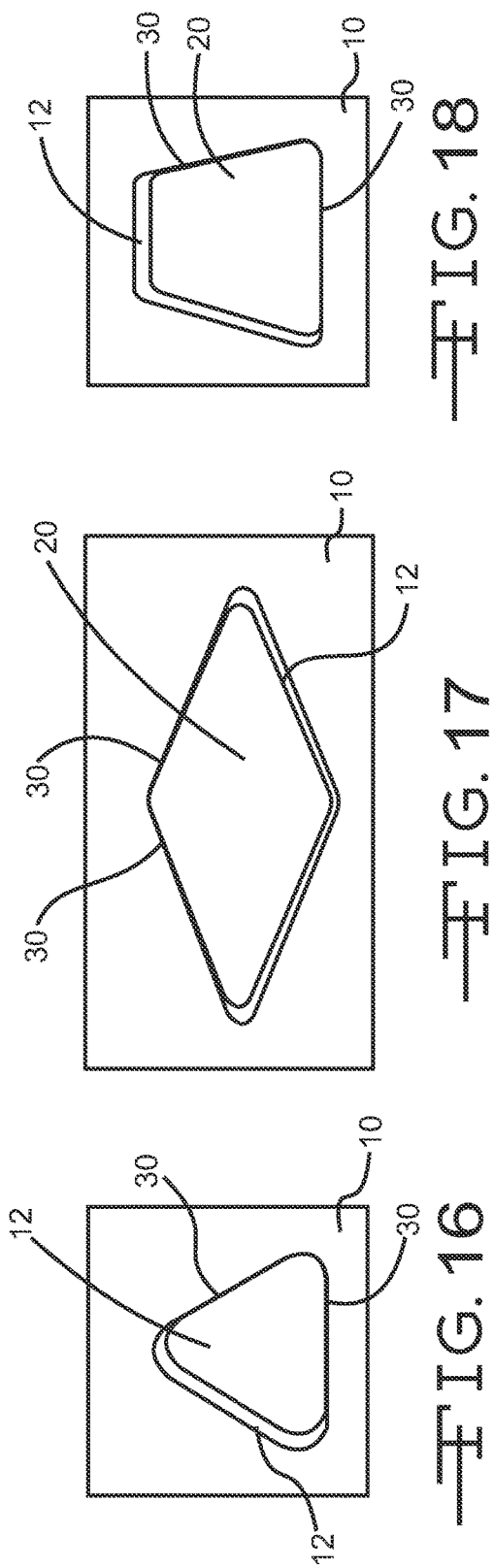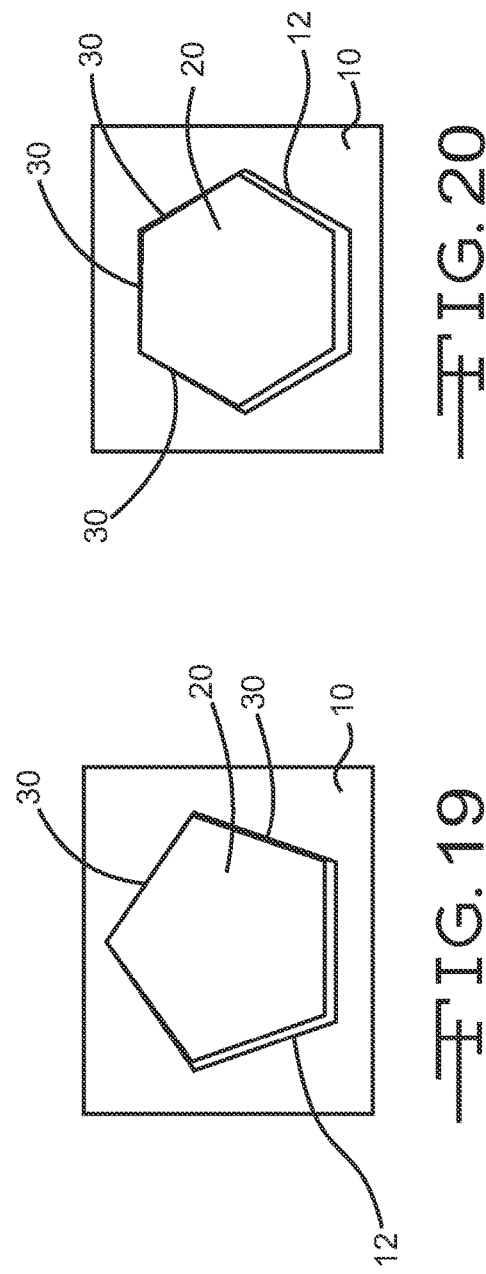

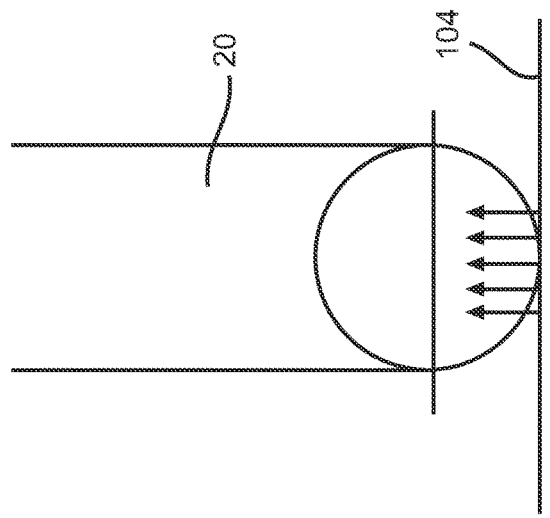
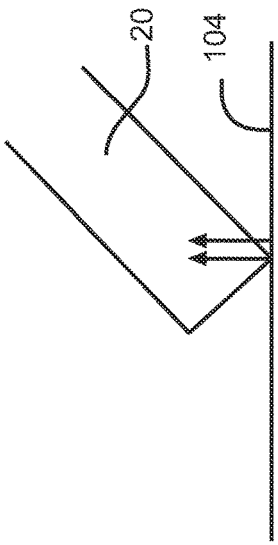
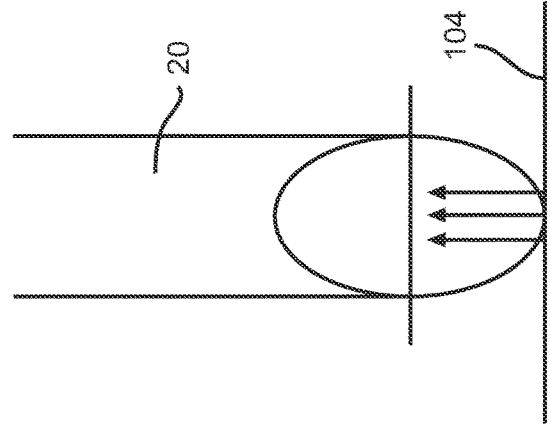
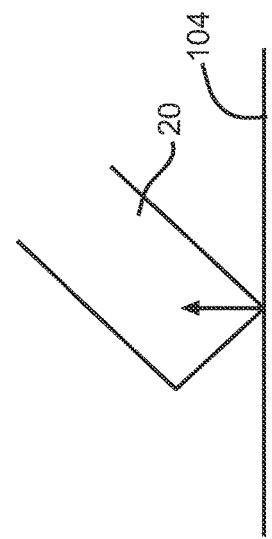

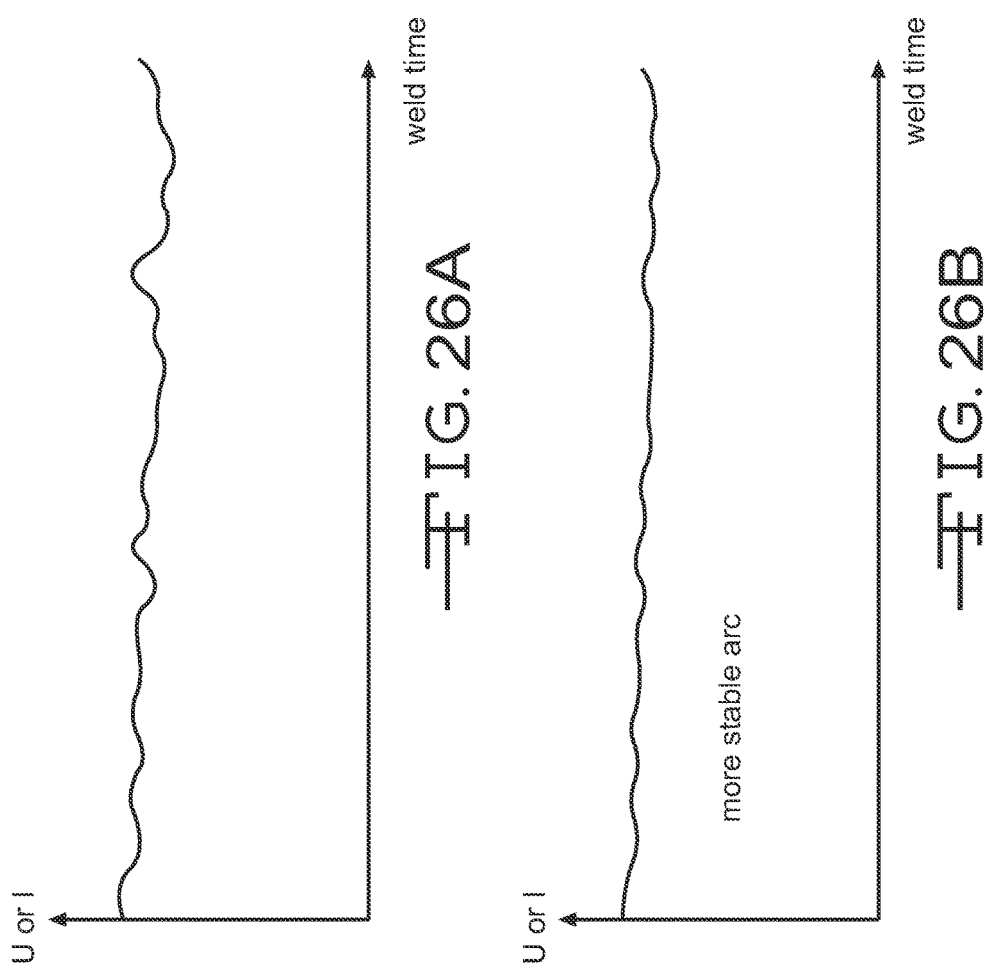

CONTACT TIP AND WELD WIRE FOR ARC WELDING

CROSS REFERENCES TO RELATED APPLICATIONS

This application is a continuation of U.S. application Ser. No. 13/299,689 filed on Nov. 18, 2011 which issued on Nov. 4, 2014 as U.S. Pat. No. 8,878,098 and which claimed the benefit of U.S. Provisional Application No. 61/415,574, filed on Nov. 19, 2010 which is hereby incorporated herein by reference in its entirety, except that the present application supersedes any portion of the above referenced application which is inconsistent with the present application.

STATEMENT REGARDING FEDERALLY SPONSORED RESEARCH OR DEVELOPMENT

Not Applicable

BACKGROUND OF THE INVENTION

(1) Field of the Invention

The present invention relates to a contact tip for a welding gun used in combination with a welding wire in a welding system where the cross-sectional shape of the bore of the contact tip is essentially the same as the cross-sectional shape of the weld wire. The present invention relates to a contact tip for a welding gun used in combination with a weld wire where the bore of the contact tip has an essentially elliptical cross-sectional shape and the weld wire has an essentially elliptical cross-sectional shape. The present invention also relates to a welding system having a welding gun with a contact tip having a bore with a modified elliptical cross-sectional shape and the weld wire with an essentially elliptical cross-sectional shape. The present invention also relates to a method of welding using a weld wire having an oval or elliptical cross-sectional shape.

BRIEF SUMMARY OF THE INVENTION

A welding system having a welding gun with a contact tip and a consumable weld wire. The contact tip having an axial bore extending therethrough. In one (1) embodiment, the cross-sectional shape of the bore of the contact tip is essentially identical to the cross-sectional shape of the weld wire. In one (1) embodiment, the bore has an essentially elliptical cross-sectional shape and the weld wire has an essentially elliptical cross-sectional shape. In one (1) embodiment, the bore has an essentially oval cross-sectional shape and the weld wire has an essentially oval cross-sectional shape. In one (1) embodiment, the bore has an essentially Rello triangle cross-sectional shape and the weld wire has an essentially Rello triangle cross-sectional shape. In one (1) embodiment, the bore has an essentially modified square cross-sectional shape where the sides of the square are arcs and the weld wire has an essentially modified square cross-sectional shape where the sides of the square are arcs. In one (1) embodiment, the bore has the cross-sectional shape of a modified pentagon where the sides of the pentagon are arcs and the weld wire has the cross-sectional shape of a modified pentagon where the sides of the pentagon are arcs. In one (1) embodiment, the bore has an essentially square cross-sectional shape where the square has rounded corners and the weld wire has an essentially square cross-sectional shape where the square has rounded corners. In one (1) embodiment, the bore has an essentially rectangular cross-sectional shape where the rectangle has rounded corners and the weld wire has an essentially rectangular cross-sectional shape where the rectangle has rounded corners. In one (1) embodiment, the bore has an essentially triangular cross-sectional shape with the triangle having rounded apexes and the weld wire has an essentially triangular cross-sectional shape with the triangle having rounded apexes. In one (1) embodiment, the bore has a cross-sectional shape of essentially a rhomboid with rounded apexes and the weld wire has a cross-sectional shape of essentially a rhomboid with rounded apexes. In one (1) embodiment, the bore has an essentially trapezoidal cross-sectional shape with rounded apexes or corners and the weld wire has an essentially trapezoidal cross-sectional shape with rounded apexes or corners. In one (1) embodiment, the bore has a cross-sectional shape of essentially a pentagon and the weld wire has a cross-sectional shape of essentially a pentagon. In one (1) embodiment, the bore has a cross-sectional shape of essentially a hexagon and the weld wire has a cross-sectional shape of essentially a hexagon.

In one (1) embodiment, the bore has a modified elliptical cross-sectional shape and the weld wire has an essentially elliptical cross-sectional shape. In one (1) embodiment, the bore is expanded along the major axis such that the length of the minor axis of the bore is increased. In this embodiment, initially the cross-sectional size of the bore and weld wire are selected with the standard tolerances or clearances. The expansion of the cross-sectional size of the bore increases the spacing or clearance between the weld wire and the bore in a direction of the minor axis of the bore. This allows for a greater contact zone between the weld wire and the contact tip. In one (1) embodiment having the bore with the expanded elliptical cross-sectional shape, the contact zone between the weld wire and the contact tip is essentially along half of the surface of the weld wire along the major axis of the weld wire.

In one (1) embodiment, the bore has a modified elliptical cross-sectional shape and the weld wire has an essentially elliptical cross-sectional shape. In one (1) embodiment, the bore is expanded along the minor axis such that the length of the major axis of the bore is increased. In this embodiment, initially the cross-sectional size of the bore and weld wire are selected with the standard tolerances or clearances. The expansion of the cross-sectional size of the bore increases the spacing or clearance between the weld wire and the bore in a direction of the major axis of the bore. This allows for a greater contact zone between the weld wire and the contact tip. In one (1) embodiment having the bore with the expanded elliptical cross-sectional shapes, the contact zone between the weld wire and the contact tip is essentially along half of the surface of the weld wire along the minor axis of the weld wire.

In one (1) embodiment, the weld wire has a modified elliptical cross-sectional shape and the bore has an essentially elliptical cross-sectional shape. In one (1) embodiment, the weld wire is reduced along the major axis such that the length of the minor axis of the weld wire is decreased. In this embodiment, initially the cross-sectional size of the bore and weld wire are selected with the standard tolerances or clearances. The reduction in the cross-sectional size of the weld wire increases the spacing or clearance between the weld wire and the bore in a direction of the minor axis of the bore. This allows for a greater contact zone between the weld wire and the contact tip. In one (1) embodiment having the weld wire with the reduced elliptical cross-sectional shapes, the contact zone between the weld wire and the contact tip is essentially along half of the surface of the weld wire along the major axis of the weld wire.

In one (1) embodiment both the bore and the weld wire have a modified elliptical cross-sectional shape. In this embodiment, initially the cross-sectional size of the bore and cross-sectional size of the weld wire are selected with the standard tolerances or clearances. The bore and weld wire are then both expanded along the major axis such that the length of the minor axis of both the bore and weld wire is increased. The resulting shape has flattened ends. In one (1) embodiment, the amount of increase of the weld wire is less than the amount of the increase of the bore.

In one (1) embodiment, the bore has an expanded circular cross-sectional shape and the weld wire has a circular cross-sectional shape. In one (1) embodiment, the bore is expanded from an initial circular cross-sectional shape and size. Initially the cross-sectional size of the bore and weld wire are selected with the standard tolerances. The bore is expanded along both axes of the bore. In this embodiment, essentially one (1) quadrant of the weld wire contacts the contact tip.

A method of welding using a weld wire having an oval or elliptical cross-sectional shape. The weld wire can be oriented for different types of welds. When the weld wire is oriented so that the minor axis is essentially aligned with the direction of welding, the weld wire provides a smooth weld bead to weld material transition and provides a weld having a broader bead margin with less depth penetration than a weld wire having a circular cross-sectional shape. In this embodiment, the thickness or dimension of the heat affected zone (HAZ) is greater than the thickness or dimension of the HAZ of a weld created using a weld wire having a circular cross-sectional shape. When the weld wire is oriented so that the major axis is essentially aligned with the direction of welding the weld has a narrow bead margin with a greater depth penetration than a weld created using a weld wire with a circular cross sectional shape. In this embodiment, the thickness or dimension of the heat affected zone (HAZ) is less than the thickness or dimension of the HAZ of a weld created using a weld wire having a circular cross-sectional shape.

The present invention relates to a combination of a contact tip and a weld wire for gas metal arc welding, the contact tip having a body with opposed ends and a bore extending between the ends wherein the weld wire is configured to extend through the bore; the improvement which comprises: the bore of the contact tip having a cross-sectional shape essentially identical to a cross-sectional shape of the weld wire wherein the cross-sectional shape of the bore is not a circle. In one (1) embodiment, the cross-sectional shape of the bore is essentially an ellipse. In another embodiment, the cross-sectional shape of the bore is essentially an oval.

Further, the present invention relates to a combination of a contact tip and a weld wire for gas metal arc welding, the contact tip having a body with opposed ends and a bore extending between the ends wherein the weld wire is configured to extend through the bore; the improvement which comprises: the bore of the contact tip having a modified elliptical cross-sectional shape with a major axis and a minor axis and the weld wire having a elliptical cross-sectional shape with a major axis and a minor axis and wherein, a difference in a cross sectional size of the bore and a cross-sectional size of the weld wire is greater in a direction of a first axis of the bore than a second axis of the bore. In one (1) embodiment, the first axis of the bore is the minor axis of the bore and the second axis of the bore is the major axis of the bore and a length of the minor axis of the bore is increased to increase the cross sectional size of the bore. In this embodiment, the length of the minor axis of the bore is increased by increasing the cross-sectional size of the bore an equal amount along a complete length of the major axis of the bore parallel to the major axis of the bore. In another embodiment, the first axis of the bore is the major axis of the bore and the second axis of the bore is the minor axis of the bore and a length of the major axis of the bore is increased to increase the cross-sectional size of the bore. In this embodiment, the length of the major axis of the bore is increased by increasing the cross-sectional size of the bore an equal amount along a complete length of the minor axis of the bore parallel to the minor axis of the bore.

Still further, the present invention relates to a combination of a contact tip and a weld wire for gas metal arc welding, the contact tip having a body with opposed ends and a bore extending between the ends wherein the weld wire is configured to extend through the bore; the improvement which comprises: the bore of the contact tip having an elliptical cross-sectional shape with a major axis and a minor axis and the weld wire having a modified elliptical cross-sectional shape with a major axis and a minor axis and wherein, a difference in a cross-sectional size of the bore and a cross-sectional size of the weld wire is greater in a direction of a minor axis of the weld wire than the major axis of the weld wire.

Further still, the present invention relates to a combination of a contact tip and a weld wire for gas metal arc welding, the contact tip having a body with opposed ends and a bore extending between the ends wherein the weld wire is configured to extend through the bore; the improvement which comprises: the bore of the contact tip having a modified elliptical cross-sectional shape with a major axis and a minor axis and the weld wire having a modified elliptical cross-sectional shape with a major axis and a minor axis and wherein, a difference in a cross-sectional size of the bore and a cross-sectional size of the weld wire is greater in a direction of a minor axis of the bore than the major axis of the bore. In this embodiment, a length of the minor axis of the bore is increased by increasing the cross-sectional size of the bore an equal amount along a complete length of the major axis of the bore parallel to the major axis of the bore without increasing a length of the major axis of the bore to create the modified elliptical cross-sectional shape of the bore, wherein a length of the minor axis of the weld wire is increased by increasing the cross-sectional size of the weld wire an equal amount along a complete length of the major axis of the weld wire parallel to the major axis of the weld wire without increasing a length of the major axis of the weld wire to create the modified elliptical cross-sectional shape of the weld wire and wherein, an amount of increase in the cross sectional size of the bore is greater than an amount of increase in the cross sectional size of the weld wire.

Still further, the present invention relates to a welding system having a welding gun which comprises a contact tip attached to the welding gun, the contact tip having a bore extending between opposed ends of the contact tip, the bore having an essentially elliptical cross-sectional shape. In one (1) embodiment, the system includes a weld wire and the weld wire has an essentially elliptical cross-sectional shape.

Further still, the present invention relates a welding system having a welding gun which comprises a contact tip attached to the welding gun and having a bore extending between opposed ends of the contact tip, the bore having a predetermined cross-sectional shape and a weld wire configured to extend through the bore. In one (1) embodiment the welding wire of the welding system has a cross-sectional shape essentially identical to the cross-sectional shape of the bore of the contact tip. In one (1) embodiment of the welding system, the bore has an essentially elliptical cross-sectional shape.

Still further, the present invention relates to a method of gas metal arc welding on a weld surface which comprises the steps of providing a welding gun having a contact tip with opposed ends and a bore extending between the ends of the contact tip, the bore having an essentially elliptical cross-sectional shape with a major axis and a minor axis; providing a weld wire having an essentially elliptical cross-sectional shape with a major axis and a minor axis, feeding the weld wire through the bore of the contact tip such that the major axis of the weld wire is essentially aligned with the major axis of the bore of the contact tip, and positioning the weld wire adjacent the weld surface. In one (1) embodiment, the weld wire is orientated so that the major axis of the weld wire is essentially aligned with a direction of welding. In another embodiment, the weld wire is orientated so that the minor axis of the weld wire is essentially aligned with a direction of welding.

The substance and advantages of the present invention will become increasingly apparent by reference to the following drawings and the description.

BRIEF DESCRIPTION OF THE DRAWINGS

FIG. 8A is a schematic cross section view of the bore 12 of the contact tip 10 having an elliptical cross-sectional shape.

FIG. 8B is a schematic cross section view of the weld wire 20 with the cut-out 24 along the major axis A2-A2 to reduce the vertical height of the weld wire 20.

FIG. 8C is a schematic cross section view of the weld wire 20 having a vertically reduced elliptical cross-sectional shape.

FIG. 8D is a cross section view of the contact tip 10 showing the bore 12 of FIG. 8A having an essentially elliptical cross-sectional shape with the weld wire 20 of FIG. 8C having the vertically reduced elliptical cross-sectional shape and showing the contact zone 30 between the weld wire 20 and the contact tip 10.

FIG. 9A is a schematic cross section view of the bore 12 having a vertically expanded elliptical cross-sectional shape and showing an insert 14 having a height α along the major axis A1-A1.

FIG. 9B is a schematic cross section view of the weld wire 20 having a vertically expanded elliptical cross-sectional shape and showing the insert 22 having a height β along the major axis A2-A2 where the height α of the insert 14 for the bore 12 is greater than the height β of the insert 22 for the weld wire 20.

FIG. 9C is a cross section view of the bore 12 of the contact tip 10 with the weld wire 20 and showing the contact zone 30 between the weld wire 20 and the contact tip 10 where both the weld wire 20 and the bore 12 have a vertically expanded elliptical cross-sectional shape formed by an insert 14 or 22 along the major axis A1-A1 or A2-A2 respectively.

FIG. 10A is a schematic cross section view of the bore 12 having a circular cross-sectional shape and showing the vertical axis C-C and the horizontal axis D-D.

FIG. 10B is a schematic cross section view of the bore 12 in an expanded position.

FIG. 10C is a schematic cross section view of the bore 12 of the contact tip 10 having an expanded, circular cross-sectional shape and showing inserts 18 and 19 along the vertical axis C-C and the horizontal axis D-D respectively.

FIG. 10D is a cross section view of the bore 12 of the contact tip 10 having an expanded circular cross-sectional shape with the weld wire 20 having a circular cross-sectional shape in the bore 12 and showing the contact zone 30 between the weld wire 20 and the contact tip 10.

FIG. 11 illustrates a Rello triangle.

FIG. 11A is a cross section view of the bore 12 of the contact tip 10 and the weld wire 20 where the bore 12 and the weld wire 20 both have a cross-sectional shape essentially similar to a Rello triangle and showing the weld wire 20 in one position in the bore 12 and showing the contact zone 30 between the contact tip 10 and the weld wire 20.

FIG. 11B is a cross section view of the bore 12 of the contact tip 10 and the weld wire 20, where the bore 12 and the weld wire 20 both have a cross-sectional shape essentially similar to a Rello triangle and showing the weld wire 20 in another position in the bore 12 and showing another contact zone 30 between the contact tip 10 and the weld wire 20.

FIG. 12 illustrates an arc modified square where the sides of the square are replaced with arcs.

FIG. 12A is a schematic cross section view of the contact tip 10 with the bore 12 and the weld wire 20 in the bore 12 where the bore 12 and the weld wire 20 both have a cross-sectional shape of an arc modified square and showing the weld wire 20 in one position in the bore 12 and showing the contact zone 30 between the contact tip 10 and the weld wire 20.

FIG. 12B is a schematic cross section view of the contact tip 10 with the bore 12 and the weld wire 20 in the bore 12 where the bore 12 and the weld wire 20 both have a cross-sectional shape of an arc modified square and showing the weld wire 20 in another position in the bore 12 and showing another contact zone 30 between the contact tip 10 and the weld wire 20.

FIG. 13 illustrates an arc modified pentagon where the sides of the pentagon are replaced with arcs.

FIG. 13A is a schematic cross section view of the contact tip 10 with the bore 12 and the weld wire 20 in the bore 12 where the bore 12 and the weld wire 20 both have a cross-sectional shape of an arc modified pentagon and showing the contact zone 30 between the contact tip 10 and the weld wire 20.

FIG. 16 is a schematic cross section view of the contact tip 10 with the bore 12 and the weld wire 20 in the bore 12 where the bore 12 and the weld wire 20 both have a cross-sectional shape essentially similar to a triangle having rounded apexes and showing the contact zone 30 between the contact tip 10 and the weld wire 20.

FIG. 17 is a schematic cross section view of the contact tip 10 with the bore 12 and the weld wire 20 in the bore 12 where the bore 12 and the weld wire 20 both have a cross-sectional shape essentially similar to a rhomboid and showing the contact zone 30 between the contact tip 10 and the weld wire 20.

FIG. 18 is a schematic cross section view of the contact tip 10 with the bore 12 and the weld wire 20 in the bore 12 where the bore 12 and the weld wire 20 both have a cross-sectional shape essentially similar to a trapezoid with rounded apexes and showing the contact zone 30 between the contact tip 10 and the weld wire 20.

FIG. 19 is a schematic cross section view of the contact tip 10 with the bore 12 and the weld wire 20 in the bore 12 where the bore 12 and the weld wire 20 both have a cross-sectional shape essentially similar to a pentagon and showing the contact zone 30 between the contact tip 10 and the weld wire 20.

FIG. 20 is a schematic cross section view of the contact tip 10 with the bore 12 and the weld wire 20 in the bore 12 where the bore 12 and the weld wire 20 both have a cross-sectional shape essentially similar to a hexagon and showing the contact zone 30 between the contact tip 10 and the weld wire 20.

FIGS. 23A and 23B are illustrations of the area of heat generation during arc initiation for a weld wire having a circular cross-sectional shape.

FIGS. 24A and 24B are illustrations of the area of heat generation during arc initiation for a weld wire 20 having an elliptical cross-sectional shape.

FIG. 26A is a graph showing the arc for a weld 102 using weld wire 20 having a circular cross-sectional shape over weld time versus welding voltage (U) or welding current (I).

FIG. 26B is a graph showing the arc for a weld 102 using weld wire 20 having an elliptical cross-sectional shape over weld time versus welding voltage (U) or welding current (I).

DETAILED DESCRIPTION OF THE INVENTION

Figure 1:
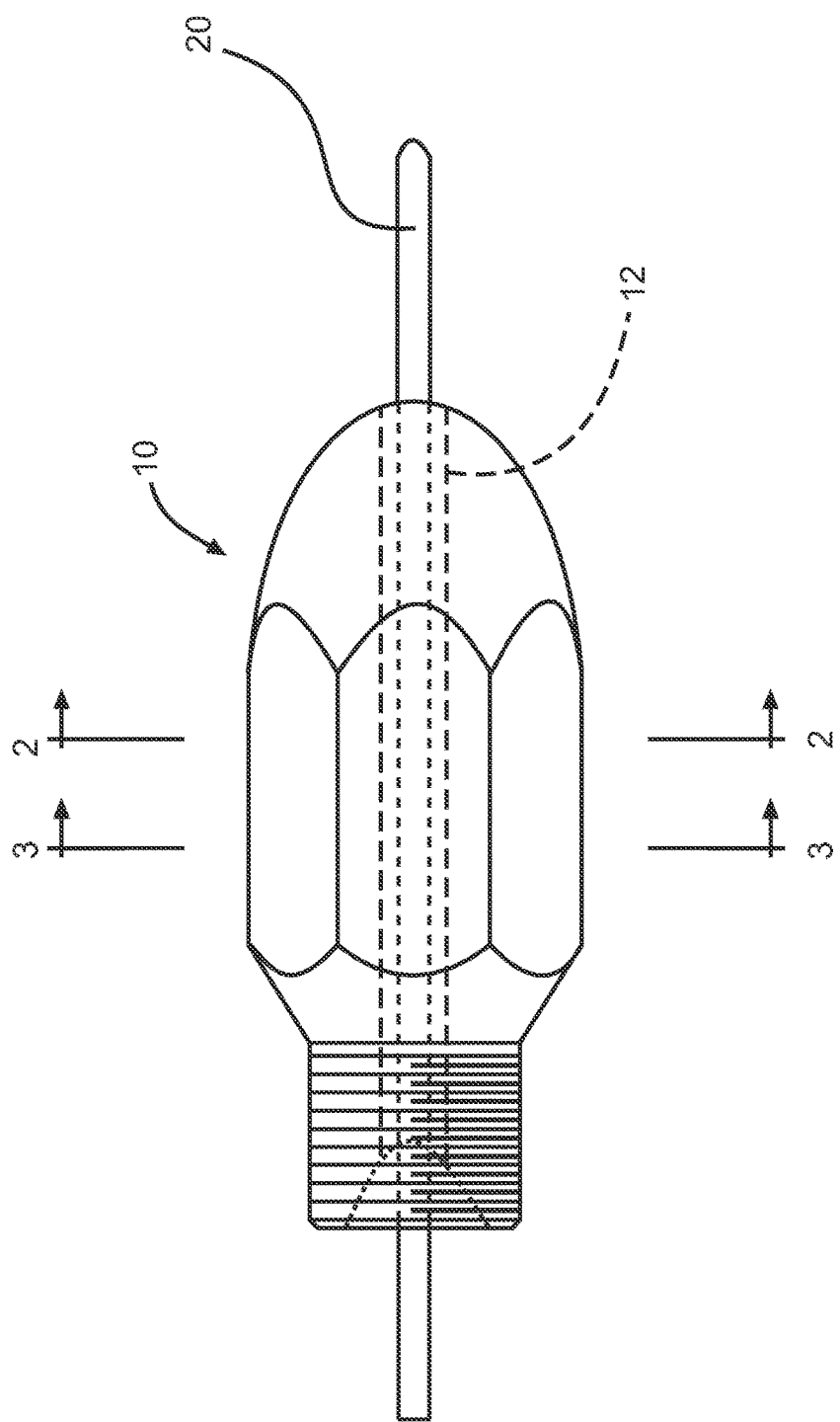
FIG. 1 is a side view of a contact tip 10 with the weld wire 20 extending through the bore 12 of the contact tip 10.
Figure 2:
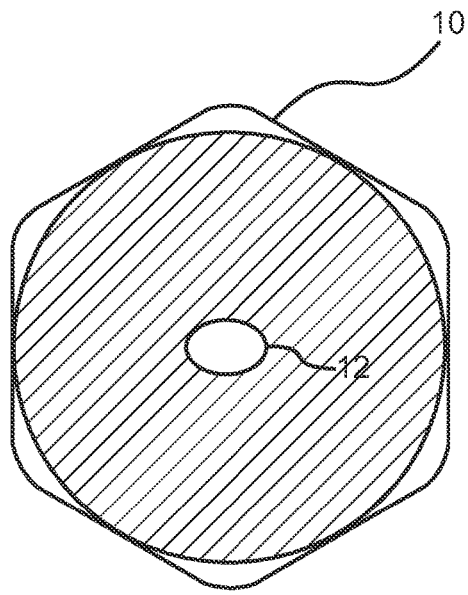
FIG. 2 is a cross section view of the contact tip 10 of FIG. 1 along the line 2-2 without the weld wire 20 showing the elliptical cross-sectional shape of the bore 12 of the contact tip 10.
Figure 3:
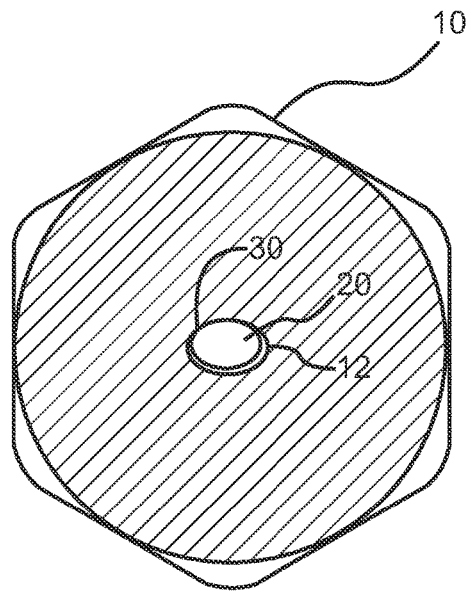
FIG. 3 is a cross section view of the contact tip 10 of FIG. 1 along the line 3-3 showing the elliptical cross-sectional shape of the bore 12 of the contact tip 10 and the elliptical cross-sectional shape of the weld wire 20 and showing the contact zone 30.

A welding system having a welding gun 100 and using weld wire 20. The welding gun 100 having a contact tip 10 with a bore 12 through which the weld wire 20 is dispensed. The welding system can be for use in gas metal arc welding (GMAW) also known as metal inert gas (MIG) welding or metal active gas (MAG) welding and any other types of welding well known in the art. The contact tip 10 has a body with a first and second end with the bore 12 extending between the ends. The outer shape and attachment mechanism of the contact tip 10 can vary depending on the use of the contact tip 10. The contact tip 10 can be constructed of any material well known in the art which is used to construct contact tips. It is understood that the contact tip 10 can be used in a variety of welding implements. The contact tip 10 can be used in connection with a variety of types of welding guns and in various different welding systems.

In one (1) embodiment, the welding gun 100 is a continuous feed, consumable wire electrode gas metal arc welding gun. The wire electrode or weld wire 20 extends through the central or axial bore 12 of the contact tip 10. The weld wire 20 is axially fed through the contact tip 10 by a conventional wire feeder (not shown). The weld wire 20 sliding against the inner wall of the contact tip 10 during the passage of the weld wire 20 through the contact tip 10 establishes the contact between the contact tip 10 and the weld wire 20 which is necessary for transfer of current (I) from power supply through the contact tip 10 to the weld wire 20. The contact tip 10 guides the weld wire 20 to the point of contact with the weld surface 104 and conducts adequate current (I) to the weld wire 20 to enable welding.

The bore 12 of the contact tip 10 is sized such as to receive the weld wire 20 and to maintain continuous contact between the contact tip 10 and the weld wire 20 while allowing the weld wire 20 to freely pass through the contact tip 10. In one (1) embodiment, the size of the bore 12 corresponds to the size of the weld wire 20 such that the standard clearances are provided between the weld wire 20 and the contact tip 10.

Figure 4A:
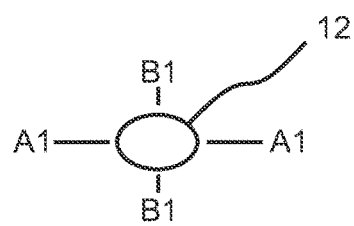
FIG. 4A is a schematic cross section view of the bore 12 having an elliptical cross-sectional shape showing the horizontal, major axis A1-A1 and the vertical, minor axis B1-B1.

In one (1) embodiment, the entire length of the bore 12 between the ends of the contact tip 10 has the same cross-sectional shape. In one (1) embodiment, the cross-sectional shape of the bore 12 is essentially an egg-shaped, smooth, convex, closed curve. In one (1) embodiment, the cross-sectional shape of the bore 12 of the contact tip 10 is such that the bore 12 does not have any sharp corners or flat edges. In one (1) embodiment, the bore 12 of the contact tip 10 has an essentially oval cross-sectional shape and has one (1) axis of symmetry. In another embodiment, the bore 12 has an essentially elliptical cross-sectional shape and has two (2) axes A1-A1 and B1-B1 of symmetry. In one (1) embodiment, the bore 12 has a horizontal or major axis A1-A1 and a vertical or minor axis B1-B1 (FIG. 4A). The elliptical or oval cross-sectional shape of the bore 12 enables the bore 12 of the contact tip 10 to have a smaller cross-sectional size while allowing the weld wire 20 to move freely though the bore 12.

The essentially oval or elliptical cross-sectional shape of the bore 12 of the contact tip 10 eliminates sharp edges, thus the contact tip 10 does not shave the weld wire 20 as the weld wire 20 is moved through or in the contact tip 10. The elimination of wire shaving reduces the coefficient of friction between the contact tip 10 and the weld wire 20. The elimination of shaving also reduces the build-up of shavings and residue in the bore 12 of the contact tip 10 which tends to hinder the movement of the weld wire 20 through the contact tip 10. In addition, the elimination of sharp edges on the contact tip 10, reduces the possibility of damaging the weld wire 20 as the weld wire 20 is moved through or in the contact tip 10. There is also less damage to the contact tip 10 which increases the life of the contact tip 10. In one (1) embodiment, a contact tip 10 having a bore 12 with an essentially oval or elliptical cross-sectional shape provides better feedability for the weld wire 20 and better stem strength.

The essentially elliptical or oval cross-sectional shape of the bore 12 of the contact tip 10 increases the contact zone 30 or the area of contact between the contact tip 10 and the weld wire 20. Increasing the contact zone 30 provides a more consistent flow of current (I) from the contact tip 10 to the weld wire 20 and provides better current (I) transfer. The use of a contact tip 10 having a bore 12 with an essentially elliptical or oval cross-sectional shape increases the weld wire 20 to contact tip 10 current transfer area. For example, for a contact tip 10 having a bore 12 with a circular cross-section used in combination with a weld wire 20 having a circular cross-section, the current transfer area is 0.004 inches (0.1016 mm). For a contact tip 10 having a bore 12 with an essentially elliptical or oval cross-sectional shape used in combination with a weld wire 20 having a circular cross-section, the current transfer area is 0.008 inches (0.2032 mm). Furthermore, for a contact tip 10 having a bore 12 with an essentially oval or elliptical cross-sectional shape, used in combination with a weld wire 20 having an essentially oval or elliptical cross-sectional shape and maintaining standard tolerances and clearances, the current transfer area is 0.024 inches (0.610 mm), or approximately six (6) times the circular bore 12 and circular weld wire 20 combination. In one (1) embodiment, larger contact zone 30 allows for easier current (I) pick up and less resistance to current transfer, which results in consistent heating of the contact tip 10 and less possibility of annealing and thus less damage to the contact tip 10 which increases the longevity of the contact tip 10. In one (1) embodiment, the length of the contact tip 10 is reduced due to the increased current transfer created by the larger contact zone 30. In one (1) embodiment, the contact tip 10 does not have a separate contact element or a retention member to hold the weld wire 20 in the bore 12 or to orient the weld wire 20 in the bore 12 of the contact tip 10.

Figure 4B:
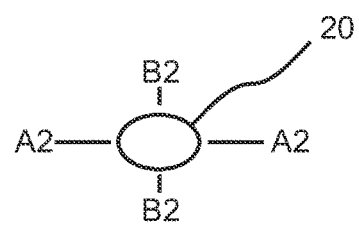
FIG. 4B is a schematic cross section view of the weld wire 20 having an elliptical cross-sectional shape showing the horizontal, major axis A2-A2 and the vertical, minor axis B2-B2.
Figure 5:
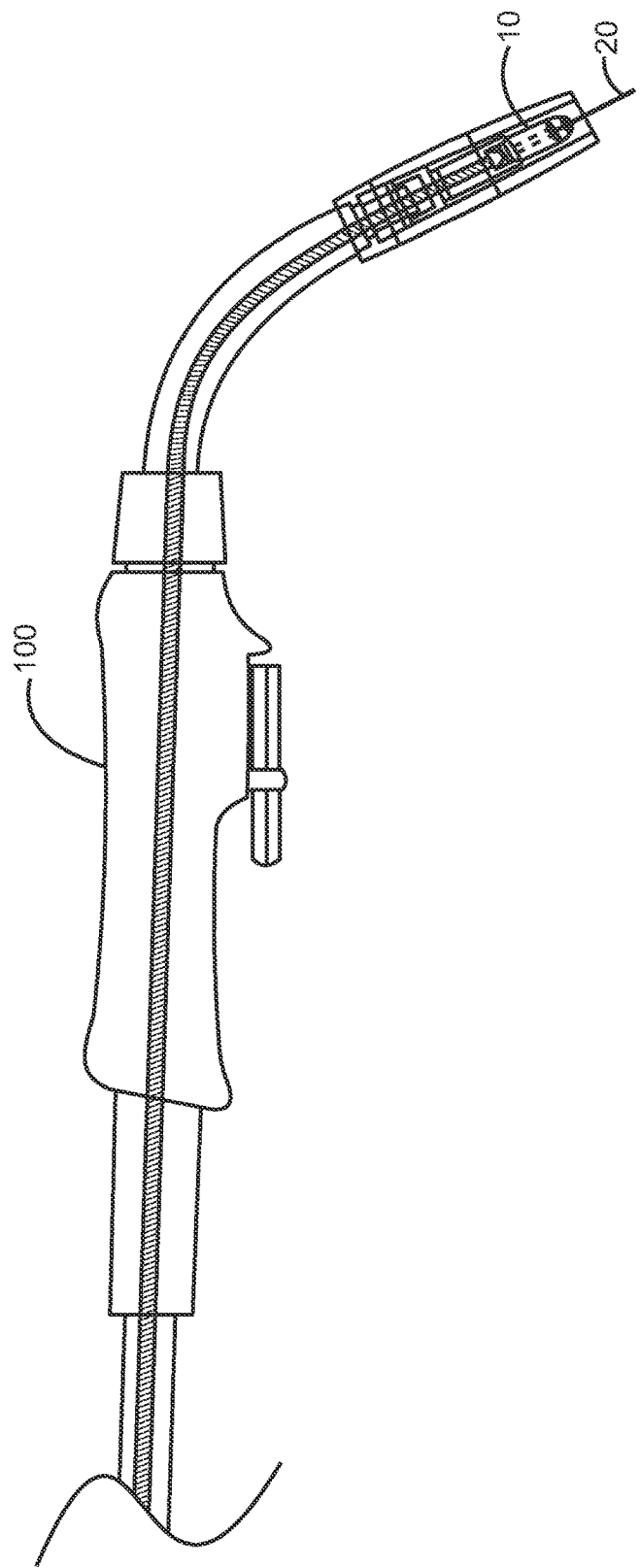
FIG. 5 is a side view of the welding gun 100 showing the contact tip 10 and the weld wire 20.

In one (1) embodiment, the weld wire 20 has a circular cross-sectional shape. In one (1) embodiment, the weld wire 20 has an essentially oval cross-sectional shape and has one (1) axis of symmetry. In one (1) embodiment, the oval cross-sectional shape of the weld wire 20 is essentially an egg-shaped, smooth, convex, closed curve. In another embodiment, the weld wire 20 has an essentially elliptical cross-sectional shape and has two (2) axes A2-A2 and B2-B2 of symmetry. In one (1) embodiment, the weld wire 20 has a horizontal or major axis A2-A2 and a vertical or minor axis B2-B2 (FIG. 4B). In one (1) embodiment, the cross-sectional shape of the weld wire 20 is such that the weld wire 20 does not have any sharp corners or flat edges. The weld wire 20 can be constructed of any material well known in the art which is used to construct weld wire 20. In one (1) embodiment, where the weld wire 20 has an essentially oval or elliptical cross-sectional shape, the weld wire 20 is formed by drawing the source material through a special die.

In one (1) embodiment, the welding system has a contact tip 10 having a bore 12 where the cross-sectional shape of the bore 12 of the contact tip 10 is essentially identical to the cross-sectional shape of the weld wire 20. In this embodiment, the contact tip 10 and weld wire 20 combination, increases the amount of contact between the contact tip 10 and the weld wire 20 to provide a more consistent flow of current (I) to the weld wire 20 while reducing the likelihood that the weld wire 20 will become jammed in the contact tip 10 thus causing failure. In this embodiment, the size of the bore 12 of the contact tip 10 is such that the clearances between the contact tip 10 and the weld wire 20 are essentially within the standard tolerances for clearance between the weld wire 20 and contact tip 10. In one (1) embodiment, the bore 12 of the contact tip 10 has an essentially elliptical or oval cross-sectional shape and is used in combination with a weld wire 20 having an essentially elliptical or oval cross-sectional shape. The use of the weld wire 20 with the essentially elliptical or oval cross-sectional shape in combination with the contact tip 10 having the bore 12 with an essentially elliptical or oval cross-sectional shape eliminates flipping of the weld wire 20 which tends to provide a better arc into the weld puddle or weld pool 106. The combination of a weld wire 20 having an elliptical cross-sectional shape and a contact tip 10 having a bore 12 with an elliptical cross-sectional shape also reduces the damage to the weld wire 20 or shaving of the weld wire 20 caused by contact between the contact tip 10 and the weld wire 20. The combination also allows for increased contact zone 30 between the weld wire 20 and the contact tip 10 which increases the consistency of the current flow between the contact tip 10 and the weld wire 20 and thus provides better current transfer.

In another embodiment where the cross-sectional shape of the bore 12 of the contact tip 10 is essentially identical to the cross-sectional shape of the weld wire 20, the bore 12 of the contact tip 10 and the weld wire 20 both have the cross-sectional shape of a Rello triangle (FIGS. 11, 11A, 11B). In still another embodiment the cross-sectional shape of the bore 12 of the contact tip 10 is essentially identical to the cross-sectional shape of the weld wire 20, the bore 12 of the contact tip 10 and the weld wire 20 have any of a variety of geometric shapes based on polygons, for example, tetragon, pentagon, hexagon, etc., where the straight sides of the polygon are replaced with arcs. In one (1) embodiment, weld wire 20 having a modified geometric shape does not flip or rotate in a similar shaped bore 12 of a contact tip 10 during welding. In one (1) embodiment, the cross-sectional shape of the bore 12 of the contact tip 10 and the weld wire 20 are any well-known regular or irregular polygons such as triangles, lozenges, trapezoids, pentagons, hexagons, etc. In one (1) embodiment, the smaller the number of angles in the shape of the bore 12 and the weld wire 20, the larger the contact surface in the contact zone 30. Weld wire 20 having a regular or irregular polygonal cross-sectional shape does not flip or rotate in a similarly shaped bore 12 of a contact tip 10 during welding which provides better arc onto the weld pool 106.

In one (1) embodiment of the welding system of the present invention, the weld wire 20 has an elliptical cross-sectional shape and the bore 12 of the contact tip 10 has an expanded or modified elliptical cross-sectional shape. In one (1) embodiment, to create the expanded or modified elliptical cross-sectional shape of the bore 12, the bore 12 of the contact tip 10 has an initial cross-sectional shape of essentially an ellipse. In one (1) embodiment, the initial cross-sectional size of the bore 12 of the contact tip 10 is essentially identical to the cross-sectional size of the weld wire 20. In one (1) embodiment, the initial cross-sectional size of the bore 12 of the contact tip 10 is slightly greater than the cross-sectional size of the weld wire 20 to ensure that the standard tolerances for clearance between the weld wire 20 and contact tip 10 are maintained. The bore 12 of the contact tip 10 is then expanded.

Figure 6A:
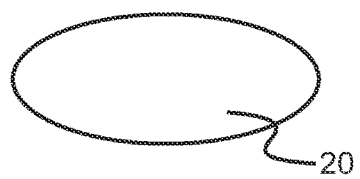
FIG. 6A is a schematic cross section view of the weld wire 20 showing the elliptical cross-sectional shape.
Figure 6B:
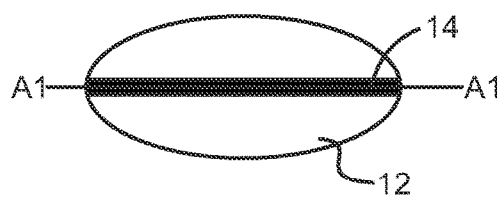
FIG. 6B is a schematic cross section view of the bore 12 having a vertically expanded elliptical cross-sectional shape with an insert 14 along the major axis A1-A1.

In one (1) embodiment, the bore 12 of the contact tip 10 is expanded vertically. To expand the bore 12 vertically, the bore 12 is conceptually cut in half along the major axis A1-A1. Next, an insert 14 is positioned between the two (2) halves of the bore 12 which vertically expands the bore 12 (FIG. 6B) such as to increase the length of the minor axis B1-B1 of the bore 12. The cross-sectional size of the bore 12 is increased by an equal amount along the entire or complete length of the major axis A1-A1 in a direction parallel to the major axis A1-A1. In one (1) embodiment, the bore 12 is increased an equal amount on each side of the major axis A1-A1. In one (1) embodiment, the clearance between the bore 12 and the weld wire 20 is greater in the direction of the minor axis B1-B1 of the bore 12.

Figure 7A:
FIG. 7A is a schematic cross section view of the weld wire 20 having an elliptical cross-sectional shape.
Figure 7B:
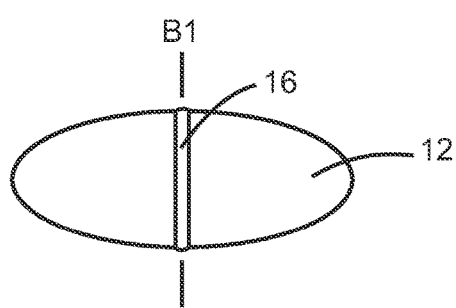
FIG. 7B is a schematic cross section view of the bore 12 having a horizontally expanded elliptical cross-sectional shape with an insert 16 along the minor axis B1-B1.

In another embodiment, the bore 12 of the contact tip 10 is expanded horizontally. To expand the bore 12 horizontally, the bore 12 is conceptually cut in half along the minor vertical axis B1-B1. An insert 16 is positioned between the two (2) halves of the bore 12 which horizontally expands the bore 12 (FIG. 7B) such as to increase the length of the major axis A1-A1 of the bore 12. The cross-sectional size of the bore 12 is increased by an equal amount along the entire or complete length of the minor axis B1-B1 in a direction parallel to the minor axis B1-B1. In one (1) embodiment, the bore 12 is increased an equal amount on each side of the minor axis B1-B1. In one (1) embodiment, the clearance between the bore 12 and the weld wire 20 is greater in the direction of the major axis A1-A1 of the bore 12.

Figure 6C:
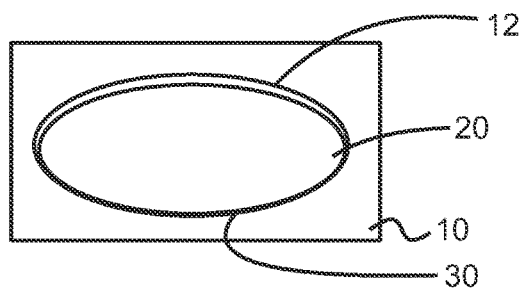
FIG. 6C is a schematic cross section view of the contact tip 10 having the bore 12 of FIG. 6B with a vertically expanded elliptical cross-sectional shape and the weld wire 20 of FIG. 6A with an essentially elliptical cross-sectional shape and showing the contact zone 30 between the contact tip 10 and the weld wire 20.
Figure 7C:
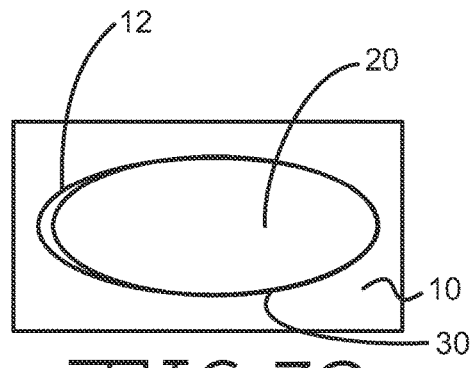
FIG. 7C is a cross section view of the contact tip 10 having the bore 12 of FIG. 7B with a horizontally expanded elliptical cross-sectional shape and the weld wire 20 of FIG. 7A having an essentially elliptical cross-sectional shape and showing the contact zone 30 between the contact tip 10 and the weld wire 20.
Figure 14:
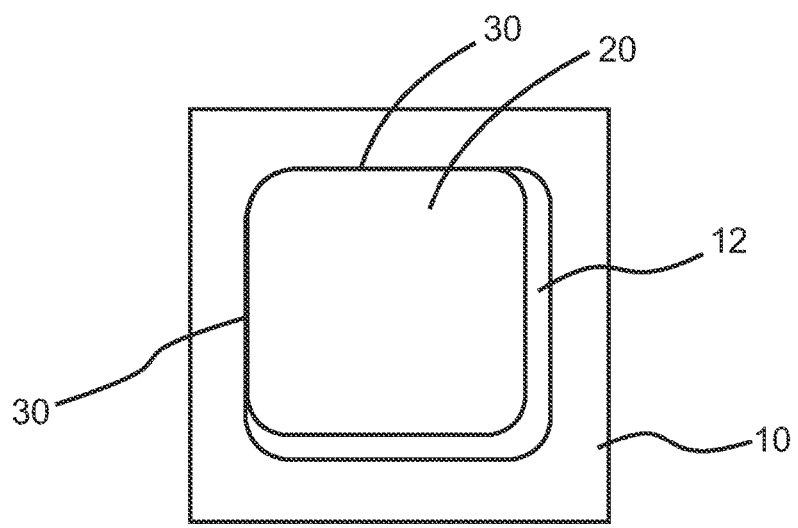
FIG. 14 is a schematic cross section view of the contact tip 10 with the bore 12 and the weld wire 20 in the bore 12 where the bore 12 and the weld wire 20 both have a cross-sectional shape essentially similar to a square having rounded corners and showing the contact zone 30 between the contact tip 10 and the weld wire 20.
Figure 15:
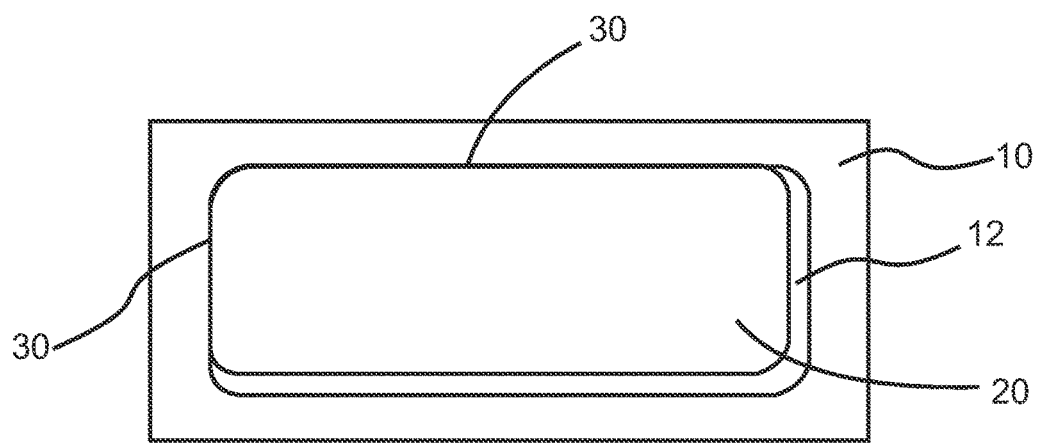
FIG. 15 is a schematic cross section view of the contact tip 10 with the bore 12 and the weld wire 20 in the bore 12 where the bore 12 and the weld wire 20 both have a cross-sectional shape essentially similar to a rectangle having rounded corners and showing the contact zone 30 between the contact tip 10 and the weld wire 20.

Increasing the vertical height or the horizontal width of the bore 12 while essentially maintaining the shape or curvature of the bore 12 increases the contact zone 30 between the weld wire 20 and the contact tip 10 while maintaining the required clearance between the weld wire 20 and contact tip 10 (FIGS. 6C and 7C). It is understood that the expanded bore 12 can be created or manufactured by any means well known in the art. It is understood that the expanded or modified elliptical cross-sectional shape of the bore 12 is not a true elliptical shape.

In another embodiment, the cross-sectional shape and cross-sectional size of the weld wire 20 is modified to provide for a larger contact zone 30. In one (1) embodiment, the bore 12 has an elliptical cross-sectional shape and the weld wire 20 has a reduced or modified elliptical cross-sectional shape. Conceptually, to create the reduced or modified elliptical cross-sectional shape of the weld wire 20, the weld wire 20 has an initial elliptical cross-sectional shape. In one (1) embodiment, the initial cross-sectional size of the weld wire 20 is essentially identical to the cross-sectional size of the bore 12 of the contact tip 10. In one (1) embodiment, the initial cross-sectional size of the weld wire 20 is slightly smaller than the cross-sectional size of the bore 12 of the contact tip 10 to ensure the standard tolerances for clearance between the weld wire 20 and the contact tip 10 are maintained. To reduce the cross-sectional size of the weld wire 20 to create the reduced or modified elliptical cross-sectional shape, a cut-out 24 is removed from the weld wire 20. In one (1) embodiment, the cross-sectional size of the weld wire 20 is reduced vertically. To reduce the weld wire 20 vertically, a cut-out 24 is removed from the weld wire 20 along the major axis A2-A2. Thus, the height of the weld wire 20 is reduced (FIGS. 8B and 8C). In one (1) embodiment, the weld wire 20 is decreased an equal amount on each side of the major axis A2-A2. In one (1) embodiment, the clearance between the bore 12 and the weld wire 20 is greater in the direction of the minor axis B1-B1 of the bore 12. In one (1) embodiment, the cross-sectional size of the weld wire 20 is reduced horizontally. In one (1) embodiment, the weld wire 20 is decreased an equal amount on each side of the minor axis B2-B2. In one (1) embodiment, the clearance between the bore 12 and the weld wire 20 is greater in the direction of the major axis A1-A1 of the bore 12. To reduce the cross-sectional size of the weld wire 20 horizontally, a cut out is removed from the weld wire 20 along the minor axis B2-B2. Thus, the width of the weld wire 20 is reduced. It is understood that the description of how the modified elliptical cross-sectional shape of the weld wire 20 is created is only used to describe the mathematical theory behind the cross-sectional shape and cross-sectional size of the weld wire 20 and does not describe the actual manufacturing process for creating the weld wire 20. It is understood that the reduced or modified elliptical cross-sectional shape of the weld wire 20 is not a true elliptical shape.

In another embodiment, both the weld wire 20 and the bore 12 of the contact tip 10 have a modified elliptical cross-sectional shape. In one (1) embodiment, both the weld wire 20 and the bore 12 have an expanded ellipse cross-sectional shape with the bore 12 having a slightly greater expanded shape. Conceptually, in this embodiment, the bore 12 and the weld wire 20 initially have an elliptical cross-sectional shape with essentially the same cross-sectional size. The cross-sectional size of the bore 12 and the weld wire 20 are expanded by positioning an insert along the major axis A1-A1 or A2-A2 which increases the height of the bore 12 or weld wire 20 and flattens the ends of the bore 12 or weld wire 20 which creates a modified elliptical cross-sectional shape. It is understood that once expanded, the weld wire 20 and bore 12 no longer have a true elliptical shape. The thickness or height α of the insert 14 for the bore 12 is greater than the thickness or height β of the insert 22 for the weld wire 20 so that once expanded, the cross-sectional size of the bore 12 is greater than the cross-sectional size of the weld wire 20 (FIGS. 9A and 9B). Modifying the cross-sectional size and cross-sectional shape of both the bore 12 and the weld wire 20 allows for a larger contact zone 30 (FIG. 9C).

In another embodiment, both the bore 12 of the contact tip 10 and the weld wire 20 initially have a circular cross-sectional shape. To increase the contact zone 30 between the contact tip 10 and the weld wire 20, the cross-sectional size and cross-sectional shape of the bore 12 are changed. In one (1) embodiment, the initial cross-sectional size of the bore 12 of the contact tip 10 is essentially identical to the cross-sectional size of the weld wire 20. In another embodiment, the initial cross-sectional size of the bore 12 and weld wire 20 are selected such as to maintain the standard clearances with the weld wire 20 having a slightly smaller cross-sectional size than the bore 12. To change the cross-sectional shape of the bore 12 and increase the cross-sectional size of the bore 12, horizontal and vertical inserts 18 and 19 are positioned in the bore 12. Conceptually, to change the cross-sectional size and cross-sectional shape of the bore 12, the bore 12 is divided into four (4) equal quadrants (FIG. 10B). The inserts 18 and 19 are then positioned between each of the four (4) quadrants. The inserts 18 and 19 extend through the center of the quadrants (FIG. 10C). In one (1) embodiment, the size of the horizontal and vertical inserts 18 and 19 are essentially identical. The resulting cross-sectional shape of the bore 12 is an expanded circle which no longer has a circular cross-section (FIG. 10D).

Figure 21C:
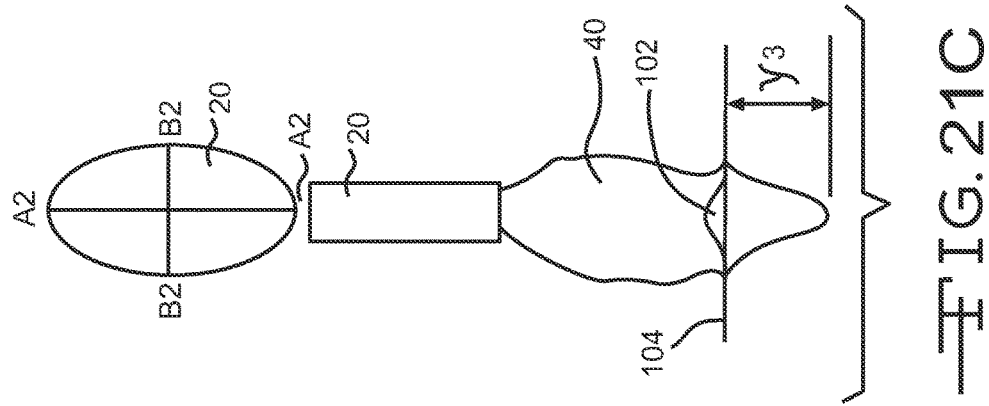
FIG. 21C is an illustration of the depth of penetration $\lambda 3$ of a weld 102 using a weld wire 20 having an elliptical cross-sectional shape where the major axis A2-A2 is essentially aligned with the direction of the weld showing the plasma stream 40, the weld 102 on the weld surface 104 and the depth of penetration $\lambda 3$ of the weld 102.
Figure 21B:
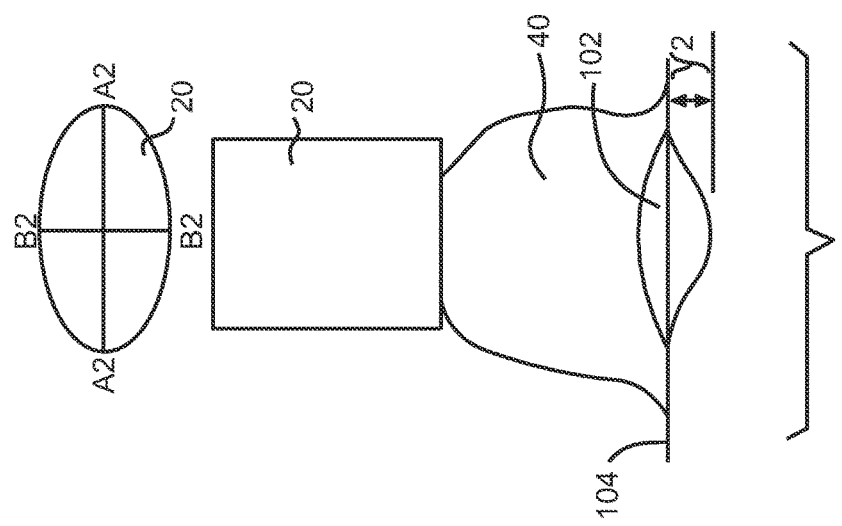
FIG. 21B is an illustration of the depth of penetration $\lambda 2$ of a weld 102 using a weld wire 20 having an elliptical cross-sectional shape where the minor axis B2-B2 of the weld wire 20 is essentially aligned with the direction of the weld showing the plasma stream 40, the weld 102 on the weld surface 104 and the depth of penetration $\lambda 2$ of the weld 102.
Figure 21A:
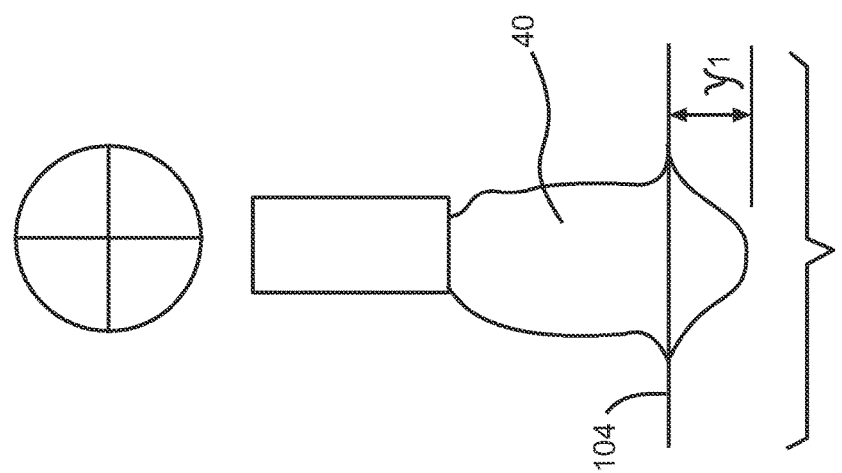
FIG. 21A is a prior art illustration of the depth of penetration $\lambda 1$ of a weld 102 using a weld wire having a circular cross-sectional shape showing the plasma stream 40 and the depth of penetration $\lambda 1$ of the weld 102.
Figure 22C:
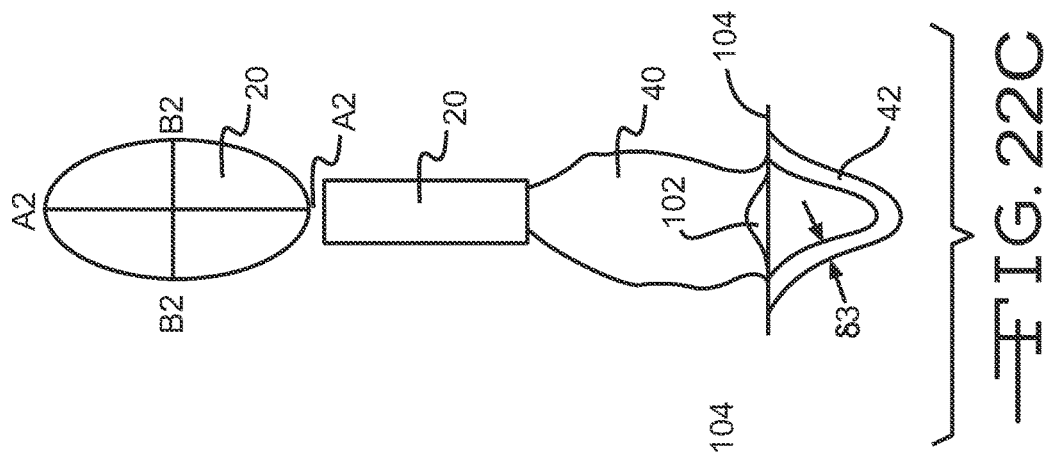
FIG. 22C is an illustration of the heat affected zone (HAZ) 42 for a weld 102 using a weld wire 20 having an elliptical cross-sectional shape where the major axis A2-A2 is essentially aligned with the direction of the weld showing the plasma stream 40, and the thickness or dimension $\delta 3$ of the HAZ 42.
Figure 22B:
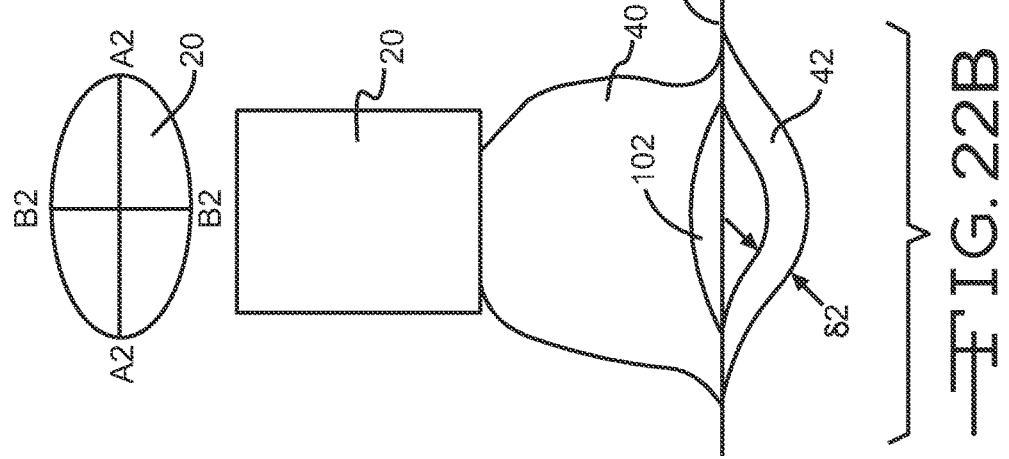
FIG. 22B is an illustration of the heat affected zone (HAZ) 42 for a weld 102 using a weld wire 20 having an elliptical cross-sectional shape where the minor axis B2-B2 of the weld wire 20 is essentially aligned with the direction of the weld showing the plasma stream 40 and the thickness or dimension $\delta 2$ of the HAZ 42.
Figure 22A:
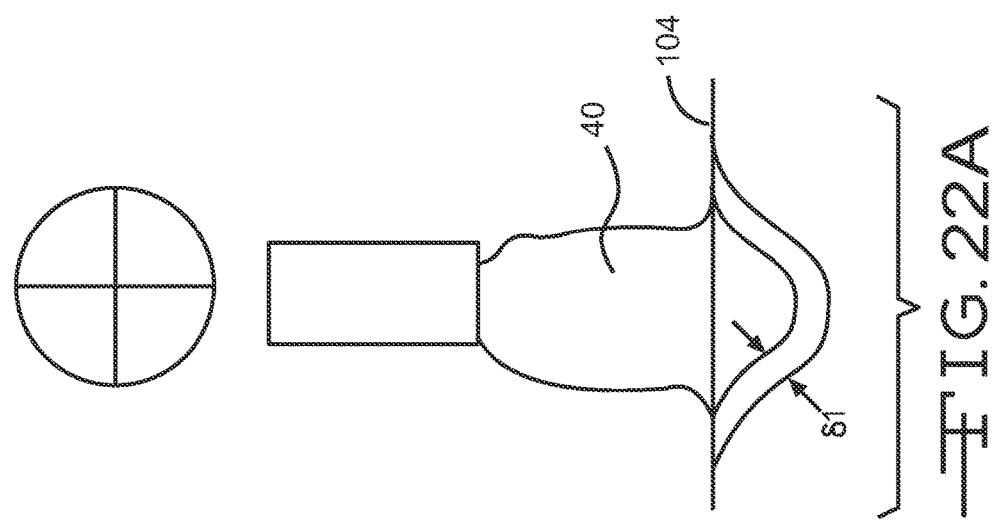
FIG. 22A is a prior art illustration of the heat affected zone (HAZ) for a weld 102 using a weld wire having a circular cross-sectional shape showing the plasma stream 40, and the thickness or dimension $\delta 1$ of the HAZ 42.
Figure 25:
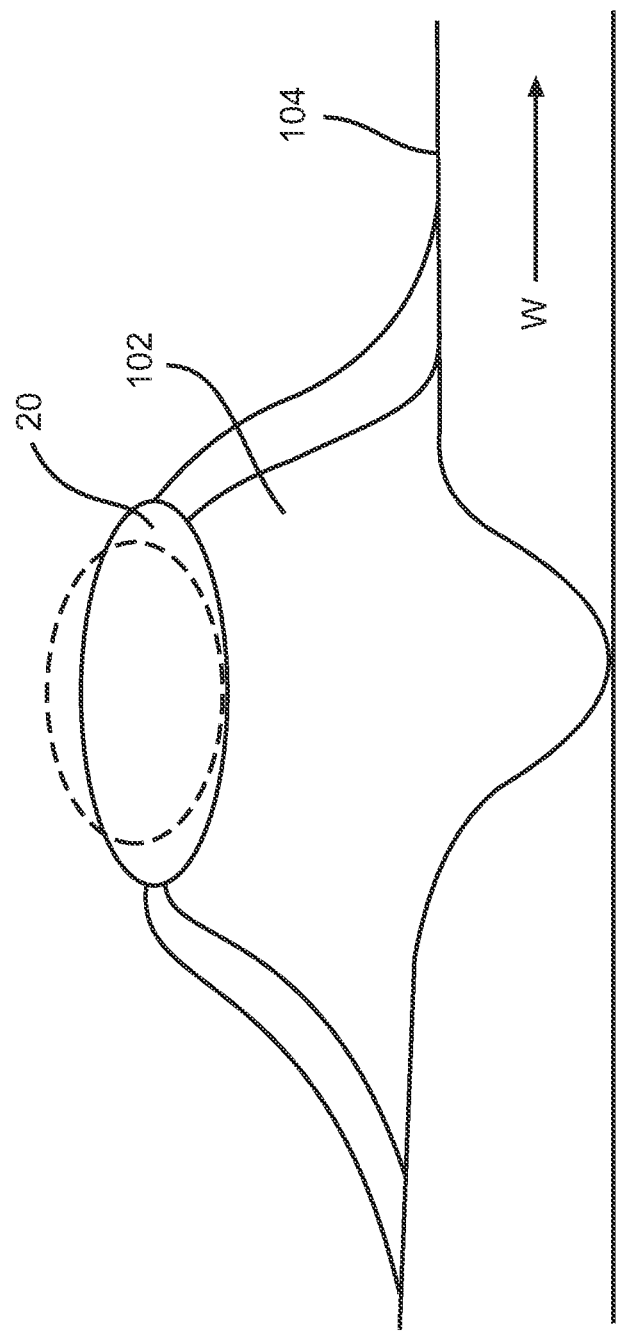
FIG. 25 is an illustration of a weld 102 using a weld wire 20 having an elliptical cross-sectional shape with the minor axis B2-B2 of the weld wire 20 essentially aligned with the weld 102 with a weld wire having a circular cross-sectional shape shown in phantom and showing the direction W of the weld, the preheating and pre-cleaning of the weld surface 104 by the weld wire 20 and smoothing action caused by the weld wire 20.
Figure 27C:
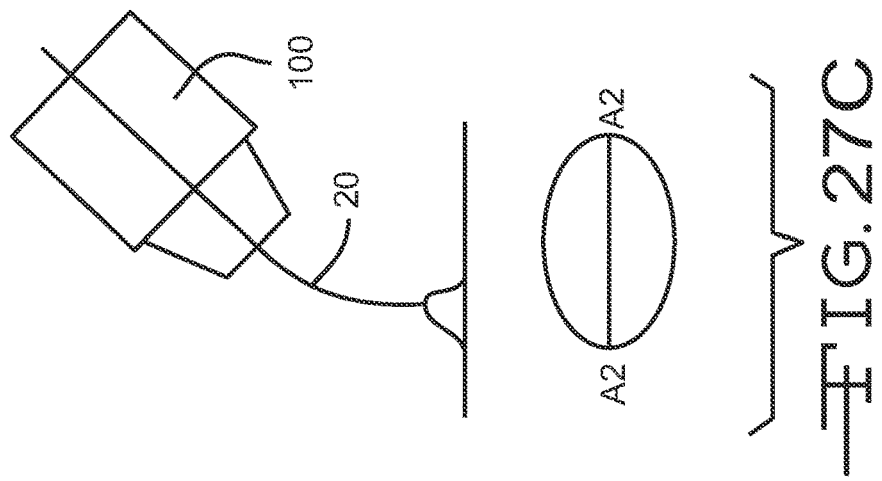
FIG. 27C is a schematic representation of wire rigidity during welding using a weld wire 20 having an elliptical cross-sectional shape where the major axis A2-A2 of the weld wire 20 is essentially aligned with the weld 102.
Figure 27B:
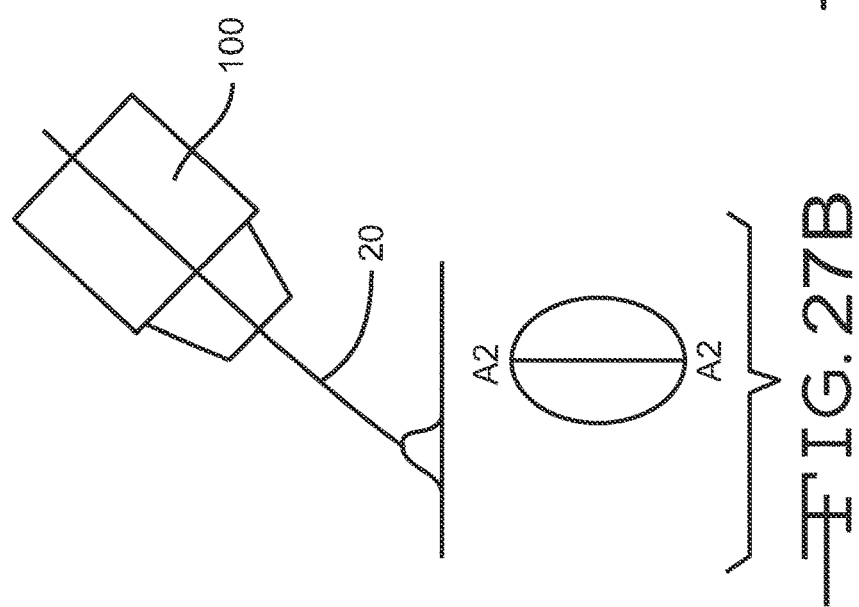
FIG. 27B is a schematic representation of wire rigidity during welding using a weld wire 20 having an elliptical cross-sectional shape where the minor axis B2-B2 of the weld wire 20 is essentially aligned with the weld 102.
Figure 27A:
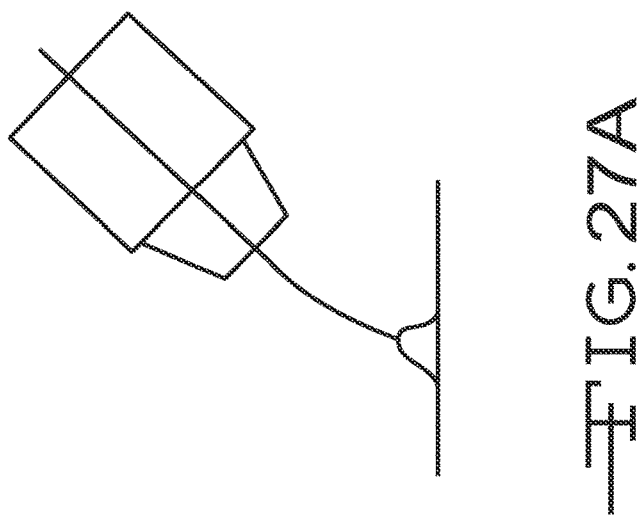
FIG. 27A is a schematic representation of wire rigidity during welding using a weld wire having a circular cross-sectional shape.

The method of welding using a weld wire 20 having an oval or elliptical cross-sectional shape has advantages over methods using weld wire having a circular cross-sectional shape. In one (1) embodiment, the method can include a contact tip 10 having a bore 12 with a variety of cross-sectional shapes. The non-symmetric shape of the oval or elliptical cross-sectional shape enables the weld wire 20 to be orientated to accommodate different types of welding needs and to produce different types of weld sizes and weld penetrations (FIGS. 21B and 21C). The benefits of using weld wire 20 having an elliptical cross-sectional shape will be described in detail, however, it is understood that weld wire 20 having an oval cross-sectional shape should produce similar benefits. For a weld wire 20 having an elliptical cross-sectional shape, the plasma stream 40 during welding has a similar elliptical shape. The ability to orientate the weld wire 20 allows for better control over the depth of penetration $\lambda 2$ or $\lambda 3$ of the weld 102 (FIGS. 21A-C). When the weld wire 20 is orientated so that the minor axis B2-B2 is essentially aligned with the welding direction, the weld wire 20 having the elliptical cross-sectional shape provides a smoother weld bead to weld material transition than with a weld created using a weld wire with a circular cross-sectional shape such that the weld 102 is stress free (FIG. 21B). When the weld wire 20 is positioned such that the minor axis B2-B2 is essentially aligned in the weld direction, the plasma stream 40 is broader which provides a weld 102 having a broader bead margin than with a weld created using a weld wire with a circular cross-sectional shape with depth penetration $\lambda 2$ (FIG. 21B) which is less than the depth penetration $\lambda 1$ for a weld created using a weld wire having a circular cross-sectional shape. When the weld wire 20 is positioned such that the major axis A2-A2 is essentially aligned in the welding direction, the plasma stream 40 is narrower which provides a weld 102 having a narrower bead margin than with a weld created using a weld wire with a circular cross-sectional shape while achieving a depth penetration $\lambda 3$ (FIG. 21C) which is greater than a depth penetration $\lambda 1$ of a weld created using a weld wire having a circular cross-sectional shape. The ability to orient the weld wire 20 also allows for better control over the size and nature of the heat affected zone (HAZ) 42 which allows the thickness or dimension $\delta 2$ or $\delta 3$ of the HAZ to be controlled (FIGS. 22B and 22C). In one (1) embodiment, the weld wire 20 is positioned such that the minor axis B2-B2 is essentially aligned in the weld direction, the thickness or dimension $\delta 2$ of the HAZ is greater than the thickness or dimension $\delta 1$ of the HAZ of a weld created using a weld wire having a circular cross-sectional shape. In one (1) embodiment, where the weld wire 20 is positioned such that the major axis A2-A2 is essentially aligned in the welding direction, thickness or dimension $\delta 3$ of the HAZ is less than the thickness or dimension $\delta 1$ of the HAZ of a weld created using a weld wire having a circular cross-sectional shape. The essentially elliptical cross-sectional shape of the weld wire 20 allows for smoother heat dissipation from the core of the arc to the periphery of the arc. This smoother heat dissipation is advantageous for heat sensitive materials. The ability to orient the weld wire 20 to change the amount of area covered by the weld wire 20 enables weld surfaces 104 with variable gaps to be filled without additional wire consumption. The bead margin of the weld 102 can be adjusted by changing the orientation of the weld wire. Orientating the weld wire 20 such that the major axis A2-A2 is essentially aligned with the direction of the welding enables a smoother arc start which provides better heat generation during arc initiation (FIGS. 25 and 26). In one (1) embodiment, where the weld wire 20 is constructed of aluminum alloys or of slightly contaminated materials, when the weld wire 20 is orientated such that the minor axis B2-B2 is essentially aligned with the weld direction or the major axis A1-A1 is essentially parallel to the direction of the weld W, the front of the plasma stream 40 can work as a pre-heater or pre-cleaner of the weld surface 104 (FIG. 25). The end of the plasma stream 40 can stabilize the violent movement of molten material in the weld pool 106 and smooth out the transition from the weld pool 106 to the solidified zone or crater of the weld 102. The use of weld wire 20 having an elliptical cross-sectional shape can produce a smoother, low or ripple free weld 102 and produce low stress, high fatigue performance welds 102 (FIG. 25). The use of weld wire 20 with an elliptical or oval cross-sectional shape will provide a more stable arc as a result of better wire 20 to contact tip 10 contact (FIG. 26B). The use of a weld wire 20 having an elliptical cross-sectional shape also allows for better control over the rigidity of the weld wire 20 during welding. When the weld wire 20 is orientated such that the minor axis B2-B2 is essentially aligned in the weld direction, the weld wire 20 is more rigid (FIGS. 27B and 27C).

In the foregoing description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are here by incorporated by reference herein in their entirety, with each claim standing on its own as a separate embodiment of the present invention.

It is intended that the foregoing description be only illustrative of the present invention and that the present invention be limited only by the hereinafter appended claims.

We claim:

1. A welding system comprising:
a contact tip and a weld wire for welding, the contact tip having a body with opposed ends and a bore extending between the ends;
wherein the weld wire is configured to extend through the bore;
wherein the bore of the contact tip has a cross-sectional shape essentially identical to a cross-sectional shape of the weld wire wherein the cross-sectional shape of the bore is not a circle; and
wherein the cross-section of the bore is uniform along its entire length, and wherein the bore defines a central longitudinal axis that is substantially linear.

2. The welding system of claim 1 wherein the cross-sectional shape of the bore is essentially an ellipse.

3. The welding system of claim 1 wherein the cross-sectional shape of the bore is essentially an oval.

4. A welding system comprising:
a contact tip and a weld wire for welding, the contact tip having a body with opposed ends and a bore extending between the ends;
wherein the weld wire is configured to extend through the bore;
wherein the bore of the contact tip has a modified elliptical cross-sectional shape with a major axis and a minor axis and the weld wire has a cross-sectional elliptical shape with a major axis and a minor axis; and
wherein, a difference in a cross sectional size of the bore and a cross-sectional size of the weld wire is greater in a direction of a first axis of the bore than a second axis of the bore.

5. The welding system of claim 4 wherein the first axis of the bore is the minor axis of the bore and the second axis of the bore is the major axis of the bore and a length of the minor axis of the bore is increased to increase the cross sectional size of the bore.

6. The welding system of claim 5 wherein the length of the minor axis of the bore is increased by increasing the cross-sectional size of the bore an equal amount along a complete length of the major axis of the bore parallel to the major axis of the bore.

7. The welding system of claim 4 wherein the first axis of the bore is the major axis of the bore and the second axis of the bore is the minor axis of the bore and a length of the major axis of the bore is increased to increase the cross-sectional size of the bore.

8. The welding system of claim 7 wherein the length of the major axis of the bore is increased by increasing the cross-sectional size of the bore an equal amount along a complete length of the minor axis of the bore parallel to the minor axis of the bore.

9. A welding system having a welding gun, the welding system comprising:
a. a contact tip attached to the welding gun and having a bore extending between opposed ends of the contact tip, the bore having a predetermined cross-sectional shape wherein the cross-sectional shape of the bore is not a circle; and
b. a weld wire configured to extend through the bore and having a cross-sectional shape essentially identical to the cross-sectional shape of the bore of the contact tip; and
c. wherein the cross-section of the bore is uniform along its entire length, and wherein the bore defines a central longitudinal axis that is substantially linear.

10. The welding system of claim 9 wherein the bore has an essentially elliptical cross-sectional shape.

11. A method of welding on a weld surface, the method comprising the steps of:
a. providing a welding gun having a contact tip with opposed ends and a bore extending between the ends of the contact tip, the bore having an essentially elliptical cross-sectional shape with a major axis and a minor axis;
b. providing a weld wire having an essentially elliptical cross-sectional shape with a major axis and a minor axis;
c. feeding the weld wire through the bore of the contact tip such that the major axis of the weld wire is essentially aligned with the major axis of the bore of the contact tip;
d. positioning the weld wire adjacent the weld surface; and
e. moving the welding gun having the contact tip along the weld surface in a direction of welding to create a weld on the weld surface.

12. The method of claim 11 wherein the positioning the weld wire adjacent the weld surface further comprises wherein the weld wire is orientated so that the major axis of the weld wire is essentially aligned with the direction of welding.

13. The method of claim 11 wherein the positioning the weld wire adjacent the weld surface further comprises wherein the weld wire is orientated so that the minor axis of the weld wire is essentially aligned with the direction of welding.

* * * * *